United States Patent
Okuwaki et al.

(10) Patent No.: US 7,097,340 B2
(45) Date of Patent: Aug. 29, 2006

(54) PLANAR LIGHT SOURCE AND METHOD OF MANUFACTURE OF THE SAME

(75) Inventors: Daisaku Okuwaki, Yamanashi (JP); Junji Miyashita, Yamanashi (JP)

(73) Assignee: Citizen Electronics Co., Ltd., Yamanashi (JP)

(*) Notice: Subject to any disclaimer, the term of this patent is extended or adjusted under 35 U.S.C. 154(b) by 8 days.

(21) Appl. No.: 10/694,994

(22) Filed: Oct. 29, 2003

(65) Prior Publication Data

US 2004/0085751 A1    May 6, 2004

(30) Foreign Application Priority Data

Oct. 29, 2002 (JP) .......................... P2002-315113

(51) Int. Cl.
*F21V 7/04* (2006.01)

(52) U.S. Cl. ...................... 362/623; 362/607; 362/619; 362/628

(58) Field of Classification Search .................. 362/31, 362/607, 619, 623, 628
See application file for complete search history.

(56) References Cited

U.S. PATENT DOCUMENTS

| | | | | |
|---|---|---|---|---|
| 4,373,282 A | * | 2/1983 | Wragg | .......................... 40/546 |
| 6,259,854 B1 | * | 7/2001 | Shinji et al. | ................. 385/146 |
| 6,712,481 B1 | * | 3/2004 | Parker et al. | ................ 362/619 |
| 6,808,281 B1 | * | 10/2004 | Ho | .............................. 362/600 |
| 7,011,442 B1 | * | 3/2006 | Okuwaki et al. | ........... 362/626 |
| 7,014,347 B1 | * | 3/2006 | Okuwaki | ...................... 362/555 |
| 2004/0085750 A1 | * | 5/2004 | Okuwaki et al. | .............. 362/31 |

* cited by examiner

*Primary Examiner*—Sandra O'Shea
*Assistant Examiner*—Anabel Ton
(74) *Attorney, Agent, or Firm*—Browdy and Neimark, PLLC

(57) ABSTRACT

The planar light source of this invention comprises: a light guide plate made of a platelike, light-transmitting material formed with a reflection surface on a bottom side thereof, the reflection surface being formed by combining a plurality of kinds of reflection means; and an illuminating light source arranged opposite a light receiving side surface of the light guide plate; wherein the light guide plate has formed smooth a boundary on the reflection surface between the plurality of kinds of reflection means so as not to form any step between the adjoining reflection means. This construction prevents the formation of a dark-bright fringe pattern between the plurality of reflections means when the light source is illuminated.

2 Claims, 10 Drawing Sheets

Fig. 3
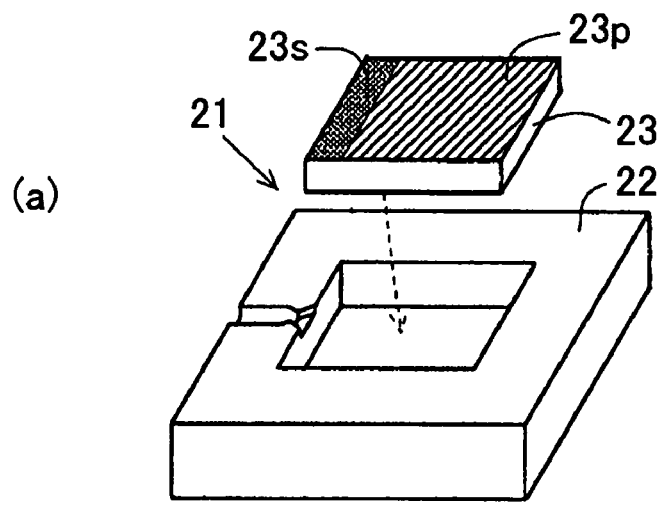
(a)
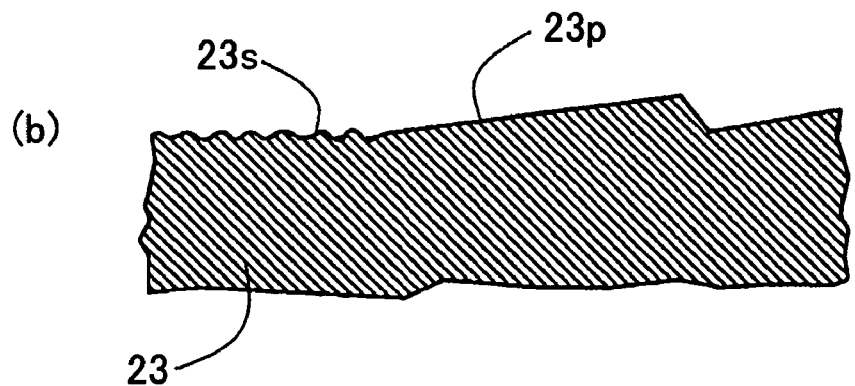
(b)
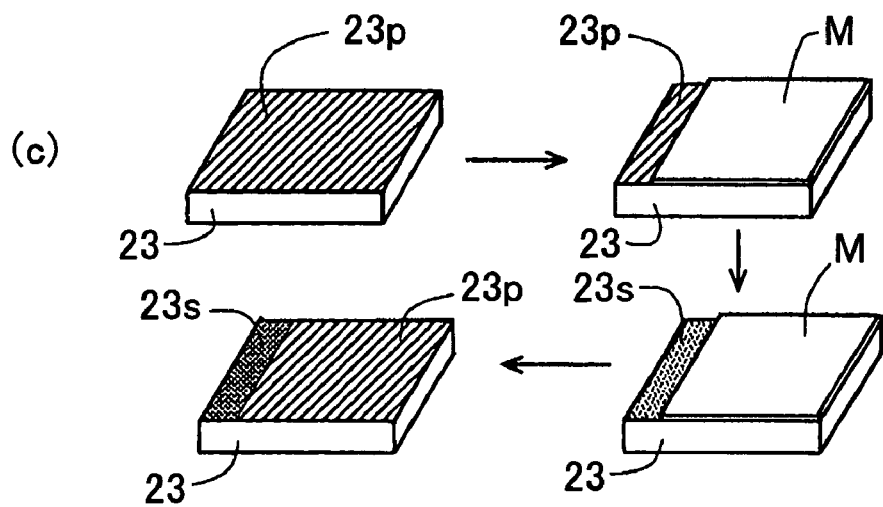
(c)

Fig. 4
(Prior Art)
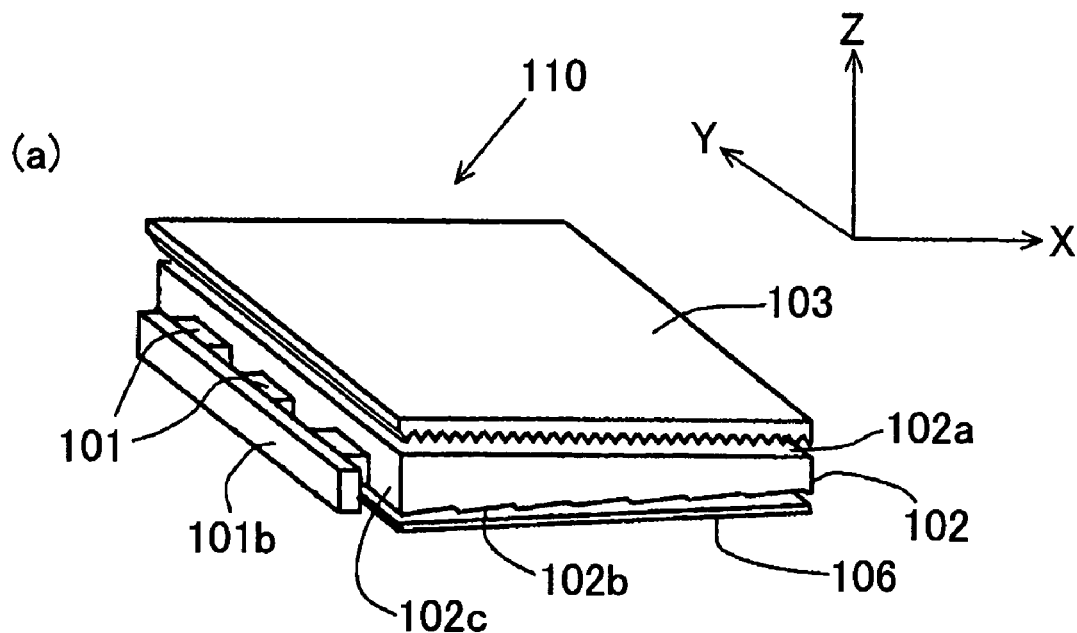
(a)
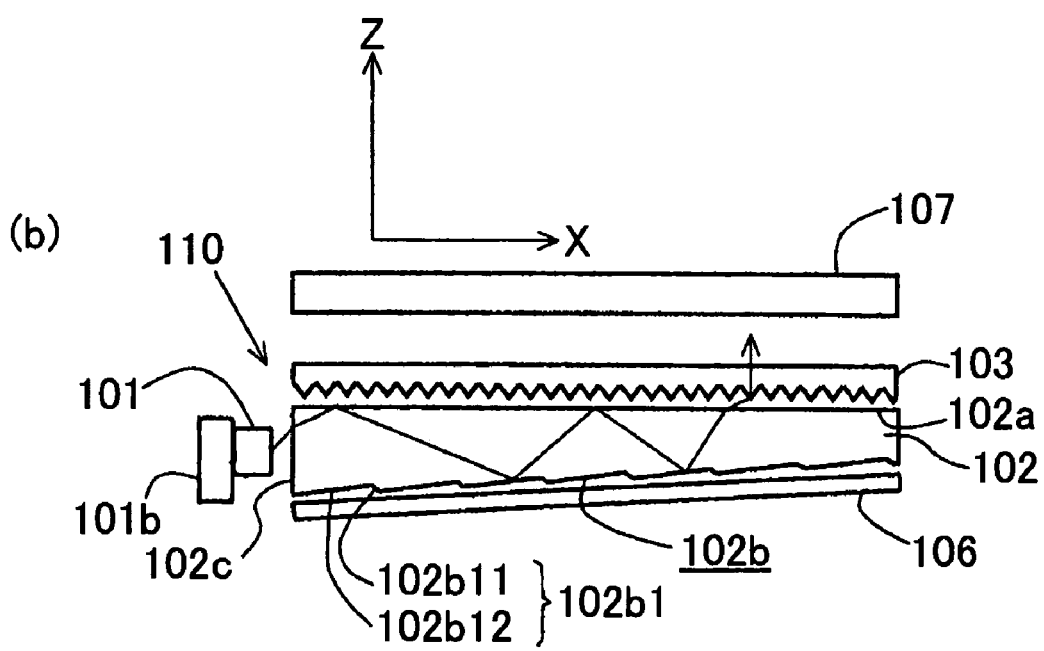
(b)

PLANAR LIGHT SOURCE AND METHOD OF MANUFACTURE OF THE SAME

BACKGROUND OF THE INVENTION

1. Field of the Invention

The present invention relates to a planar light source for illuminating a liquid crystal panel and the like and a method of manufacture of the same.

2. Description of the Prior Art

Small liquid crystal displays have been used in recent years in cellular phones and other portable information terminals and, as a means for illuminating such liquid crystal displays, a planar light source is used. The planar light source is constructed of a plate-like light guide plate and light emitting diodes (LEDs) arranged to face a side surface of the light guide plate. Thanks to its ability to be reduced easily in size and thickness, the planar light source has found wide uses.

In the planar light source, light emitted from the LEDs enters into the light guide plate and propagates as it is repetitively reflected within the light guide plate. The light is reflected or refracted by grooves or a textured pattern formed in an underside of the light guide plate until it goes out of the plate. The light emitted from the top surface of the light guide plate travels toward and illuminates the liquid crystal display.

An example of such a conventional planar light source is shown in FIG. 4 (e.g., Japanese Patent Application No. 2002-093383, FIG. 7). FIG. 4 illustrates a construction of a planar light source 110, FIG. 4A and FIG. 4B representing a perspective view and a side view thereof respectively.

In FIG. 4, the planar light source 110 has LEDs 101 as a light source, a light guide plate 102, a prism sheet 103, a reflector plate 106 and a liquid crystal panel 107. The light guide plate 102 is rectangular and made of a light-transmitting glass or resin. Denoted 102a is a top surface of the light guide plate 102. Designated 102c is a light receiving side surface facing the LEDs 101. Designated 102b is a bottom surface of the light guide plate 102. The bottom surface 102b is formed with a plurality of asymmetric prisms 102b1 facing the top surface 102a. The asymmetric prisms 102b1 each comprise a down slope 102b11 whose distance to the top surface 102a sharply increases as it moves away from the light receiving side surface 102c and an up slope 102b12 whose distance to the top surface 102a moderately decreases. Arranged opposite the light receiving side surface 102c are three LEDs 101 supported on a retainer member 101b.

When a predetermined amount of electricity is supplied from a power supply not shown to the LEDs 101, the LEDs 101 illuminate in white or a predetermined color. The light emitted from the LEDs 101 is refracted by the light receiving side surface 102c as it enters the light guide plate 102. The light that has entered the light guide plate 102 is repetitively reflected between the top surface 102a and the bottom surface 102b of the light guide plate 102 before it is refracted by the top surface 102a and leaves the light guide plate 102. The light then enters the prism sheet 103, in which it is specular-reflected until its propagation direction is changed to a Z direction. The light traveling in the Z direction is now incident on the liquid crystal panel 107. Therefore, the light passes through the liquid crystal in an ideal direction, making a clear and vivid image display possible.

FIG. 5 is a side view showing a path of light emitted from the LEDs 101 that has entered the light guide plate 102. In the figure, a light ray emitted from the LEDs 101 at an output or emittance angle of θi enters the light receiving side surface 102c of the light guide plate 102 at an incidence angle of θi. At this time, the ray is refracted on this plane and a relationship between the incidence angle θi and a refracted angle θ is, according to Snell's law, n·sinθ=sinθi assuming that a refractive index of air is 1 and a refractive index of the light guide plate 102 (made of polycarbonate and the like) is n. From this we obtain $$\theta = \sin^{-1}((1/n)\sin \theta i) \tag{1}$$

If, for example, the light guide plate 102 has a refractive index of n=1.58 and θi=90°, calculating the equation (1) results in θ=sin⁻¹(1/1.58)=39.3° and thus the critical angle θc is θc=39.3°.

It should be noted, however, that since the incidence angle in reality is less than 90° at maximum, the refracted angle θ even at its maximum is less than the critical angle θc. The critical angle θc of the light guide plate 102 is generally around 40°, so the refracted angle θ even at its maximum does not exceed 40°. The light ray that has passed through the light receiving side surface 102c at the refracted angle θ is incident on the top surface 102a of the light guide plate 102 at an incidence angle $\theta_1$. At this time, as can be seen from FIG. 5, since a relation of (θ+$\theta_1$=90°) holds and the refracted angle θ is equal to or less than 40°, as described above, the incidence angle $\theta_1$ is equal to or more than 50°, which is larger than the critical angle θc of around 40°. Thus, the ray incident on the top surface 102a is totally reflected at a reflection angle $\theta_1$.

The reflected light then strikes, at an incidence angle of $\theta_2=\theta_1-\alpha$, the up slope 102b12 of the bottom surface which has an inclination angle of α. Here the inclination angle α is about 1° to several degrees.

The ray that has struck the up slope 102b12 at an incidence angle $\theta_2$ is reflected by this surface at a reflection angle $\theta_2$ and then strikes the top surface 102a at an incidence angle of $\theta_3=\theta_2-\alpha=\theta_1-2\alpha$. The ray is then reflected by the top surface 102a at a reflection angle $\theta_3$ to hit the up slope 102b12 at an incidence angle of $\theta_4=\theta_3-\alpha=\theta_1-3\alpha$. Each time the light ray, that was first reflected by the top surface 102a at a reflection angle $\theta_1$, strikes the up slope 102b12 or the top surface 102a, its incidence angle decreases by an amount equal to the inclination angle α. That is, when the ray, that was first reflected at a reflection angle of $\theta_1$, strikes the up slope 102b12 or top surface 102a for an Nth time after repetitive reflections, its incidence angle $\theta_N$ is given by $$\theta_N = \theta_1 - (N-1)\alpha \tag{2}$$

In this light guide plate, the light incidence or reflection on its boundary surface, shown at $\theta_1$, is counted as the first incidence/reflection (i.e., N=1).

When the decreasing incidence angle $\theta_N$ has the following relation with the critical angle θc:

$$\theta_N = \theta_1 - (N-1)\alpha < \theta_c \tag{3}$$

then, the ray passes through the top surface 102a or the up slope 102b12 of the bottom surface 102b and gets out of the light guide plate 102. For example, if $\theta_1$=52°, α=1° and θc=40°, the condition of equation (3) is met when N is more than 13. This means that the light ray must strike the top or bottom surface of the light guide plate 102 fourteen times or more. Therefore, near the light receiving side surface 102c the ray does not escape to the outside. For example, if the light guide plate 102 has a thickness of 1 mm, the ray does not normally exit the light guide plate 102 from within about 3 mm of the light receiving side surface 102c. As a result, of the area of the light guide plate 102 the region that can be used as a light generation region decreases, reducing a space efficiency, which is detrimental to a size reduction of the device.

Thus, the planar light source 110 of FIG. 4, rather than being used as is, is often improved as shown in FIG. 6. FIG. 6A is an overall side view and FIG. 6B is an enlarged view of a portion C of FIG. 6A. In FIG. 6, denoted 120 is an improved planar light source in which a reference number 102bh represents a textured reflection surface provided on the bottom surface 102b of the light guide plate 102 near the light receiving side surface 102c. The textured reflection surface 102bh has an irregular pattern of fine, recessed and raised portions. The planar light source 120 therefore has on the underside of the housing 102 a reflection means provided by the textured reflection surface 102bh in addition to a reflection means provided by the asymmetric prisms 102b1. Designated 102D is a step formed at a boundary between the reflection means of the asymmetric prisms 102b1 and the reflection means of the textured reflection surface 102bh. In other respects, the symbols and construction are similar to those of the planar light source 110 shown in FIG. 4. The step 102D either rises or falls, and its edge has an angle of nearly 90°.

As shown in FIG. 6, of the light rays that have entered from the LEDs 101 through the light receiving side surface 102c into the light guide plate 102, some rays strike, and are scattered by, the textured reflection surface 102bh before traveling directly toward the top surface 102a and some rays go out of the light guide plate 102 and are reflected by the reflector plate 106 to reenter the light guide plate 102 and travel toward the top surface 102a, as indicated by solid lines in FIG. 6A. So, there are light paths involving the textured reflection surface 102bh in addition to the light paths using the asymmetric prisms 102b1, as indicated by a dashed line. As a result, light can be emitted upward from even an area of the top surface 102a of the light guide plate 102 which is close to the light receiving side surface 102c, thus expanding the illumination area to near the light receiving side surface 2c.

However, even the improved light guide plate 102 often experiences the following problems. As shown in a plan view of FIG. 7, in an area S1 within 3–4 mm of the light receiving side surface 102c of the light guide plate 102 several bright lines 14 show up (in FIG. 7 the bright lines are shown hatched with thick lines). S2 represents an area where bright lines do not show. The conspicuous bright lines 14 are considered to be caused as follows. As shown in FIG. 6B, light rays from the LEDs 101 that entered the light receiving side surface 102c reach an edge portion of the step 102D in the bottom surface 102b of the light guide plate 102.

If the edge portion has a rough surface, rather than a mirror surface, the light rays from the LEDs 101 enter the edge portion not through normal refraction but through scattering. That is, from the edge portion, a plurality of rays travel through the light guide plate 102 in different directions, making the edge portion look as if it were illuminating. Thus, the edge portion can be regarded as a secondary light source. Since the edge portion is formed at right angles, its transferability in a molding process is bad, rendering its surface rough, which in turn results in a secondary light source being easily formed.

Next, as shown in FIG. 8 the secondary light source at the step 102D emits rays of light in various directions. Of these rays, those that are incident on the top surface 102a of the light guide plate 102 at incidence angles less than the critical angle θc pass through this surface by refraction and get out of the light guide plate 102, as indicated by rays s21, s22. This direct outward transmission of these rays occurs continuously in a wide range of area and therefore no bright lines are produced. When the incidence angles exceed the critical angle θc, the light rays are reflected by the top surface 102a and directed toward the bottom surface 102b, as indicated by rays S31, S32, S33. Then, after one to several reflections these rays pass through the top surface 102a and go out as illuminating light. The number of times that these rays are reflected before being emitted outside increases as the first incidence angle on the top surface 102a becomes larger, according to the principle already explained (see Equation (3)).

That is, the number of reflections increases, from 1 to 2 to 3, according to the light paths S31, S32, S33. Hence, the positions on the top surface 102a of the light guide plate 102 from which the light rays go out are separated from each other, resulting in discrete bright lines as shown in FIG. 7. As for a width of light flux, let us turn to FIG. 9 and compare light fluxes $\phi_1$ and $\phi_3$ which correspond to the light paths s31 and s33 of FIG. 8. Let a width of light flux $\phi_1$ as it exits the top surface 102a of the light guide plate 102 be $b_1$ and a width of light flux $\phi_3$ be $b_3$. It is seen that the light width $b_3$ is significantly larger than the width $b_1$. This is considered due to the fact that as the number of reflections for each light path increases, a length of the light path also increases and, almost in proportion to the path length, the width of the light flux increases. Thus, as shown in FIG. 7, the width of the bright lines progressively widens away from the light receiving side surface 102c of the light guide plate 102. As the number of reflections for each light path increases further and the width of each flux exiting the top surface 102a of the light guide plate 102 widens, a light quantity per unit area, i.e., brightness lowers, with the result that the bright lines become indistinguishable in an area more than a certain distance away from the light receiving side surface 102c, as shown in FIG. 7.

As described above, the marked bright lines are caused by the step 102D (see FIG. 6 and FIG. 8) in the bottom surface 102b of the light guide plate 102. This step 102D is formed by a plurality of inserts (in-cavity molding pieces having recessed and raised transfer surfaces) during the process of molding the light guide plate 102. FIG. 10 illustrates essential parts of a conventional mold used in molding the light guide plate 102. In FIG. 10, denoted 121 is a mold frame, 122 an insert for textured pattern, and 123 an insert for prism pattern. The insert 122 for the textured pattern has its surface formed with a pattern of undulations corresponding to the textured reflection surface 102bh of FIG. 6, and the insert 123 for the prism pattern has its surface formed with a pattern of recesses and projections corresponding to the asymmetric prisms 102b1 provided on the bottom surface 102b of the light guide plate 102. The light guide plate 102 is formed in the following process. First, as shown in FIG. 10A, the insert 122 for the textured pattern and the insert 123 for the prism pattern are placed inside the mold frame 121. Next, as shown in FIG. 10B, both of these inserts 122, 123 are set close together. Then, a melted resin is injected into the mold frame 121 to mold the light guide plate 102 and transfer the surface patterns of these inserts 122, 123 to the light guide plate 102.

In this process, as shown in a cross section of FIG. 10C, a step D is often formed between the textured pattern insert 122 and the prism pattern insert 123 and is transferred onto the light guide plate 102 as the step 102D of FIG. 6. The edge of the step D is almost at right angles. It is noted that the step D, which is formed by a difference in thickness between the textured pattern insert 122 and the prism pattern insert 123, is very difficult to eliminate by equalizing the thickness of these inserts because the thicknesses of the inserts 122, 123 change when forming their recessed/raised surface patterns.

As described above, the step D formed between the inserts 122 and 123 is transferred to the conventional light guide plate 102 as the step 102D in the reflection surface. So, when light is illuminated from the light guide plate 102 of the above construction, bright lines produced by this step show up. The bright lines in turn form bright and dark fringes, marring the appearance of the planar light source.

SUMMARY OF THE INVENTION

The present invention has been accomplished in light of the above drawbacks experienced with prior art, and it is an object of the present invention to provide a planar light source which has a light guide plate and an illuminating light source such as LED arranged by the side of the light guide plate and which can prevent the formation of a bright line-induced, dark-bright fringe pattern by suppressing the bright lines produced by a step on a reflection surface of the light guide plate. It is also an object of this invention to provide a method of manufacturing the planar light source.

To achieve the above objective, the planar light source of this invention comprises: a light guide plate made of a platelike, light-transmitting material formed with a reflection surface on a bottom side thereof, the reflection surface being formed by combining a plurality of kinds of reflection means; and an illuminating light source arranged opposite a light receiving side surface of the light guide plate; wherein the light guide plate has formed smooth a boundary on the reflection surface between the plurality of kinds of reflection means so as not to form any step between the adjoining reflection means.

In one embodiment of the planar light source of this invention, the reflection surface is formed by using a single in-cavity molding piece which has transfer surfaces corresponding to the plurality of kinds of reflection means.

As the plurality of kinds of reflection means, the reflection surface has a reflection means formed of prisms and a reflection means formed of textured undulations of a predetermined shape.

To achieve the above objective, the method of manufacturing a planar light source according to this invention, which planar light source has on a bottom side of a light guide plate a reflection surface having a plurality of kinds of reflection means, comprises the steps of: installing inside a mold for the light guide plate a single in-cavity molding piece having transfer surfaces corresponding to the plurality of kinds of reflection means; and injecting a melted resin into the mold to form the reflection surface in such a manner as will not form a step between the plurality of kinds of reflection means.

In one embodiment of the manufacturing method of this invention, the transfer surfaces of the single in-cavity molding piece are formed with an undulated transfer surface corresponding to a reflection means formed of prisms and with an undulated transfer surface corresponding to a reflection means formed of textured undulations of a predetermined shape.

As the method of forming the transfer surfaces of the single in-cavity molding piece, this invention performs the steps of: forming, over the entire transfer surface corresponding to the reflection surface of the light guide plate, an undulated transfer surface corresponding to the reflection means formed of prisms; masking a part of the undulated transfer surface; and forming through honing, over the remaining unmasked part of the transfer surface, an undulated transfer surface corresponding to the reflection means formed of textured undulations of a predetermined shape so that the prism-based undulated transfer surface and the texture-based undulated transfer surface are formed on the same transfer surface of the single in-cavity molding piece.

BRIEF DESCRIPTION OF THE DRAWINGS

FIG. 3 is an explanatory diagram showing a process of manufacturing the planar light source of FIG. 1 and represents a second embodiment of the planar light source of this invention.

FIG. 4 is an explanatory view showing a conventional planar light source.

DESCRIPTION OF PREFERRED EMBODIMENTS

Figure 1:
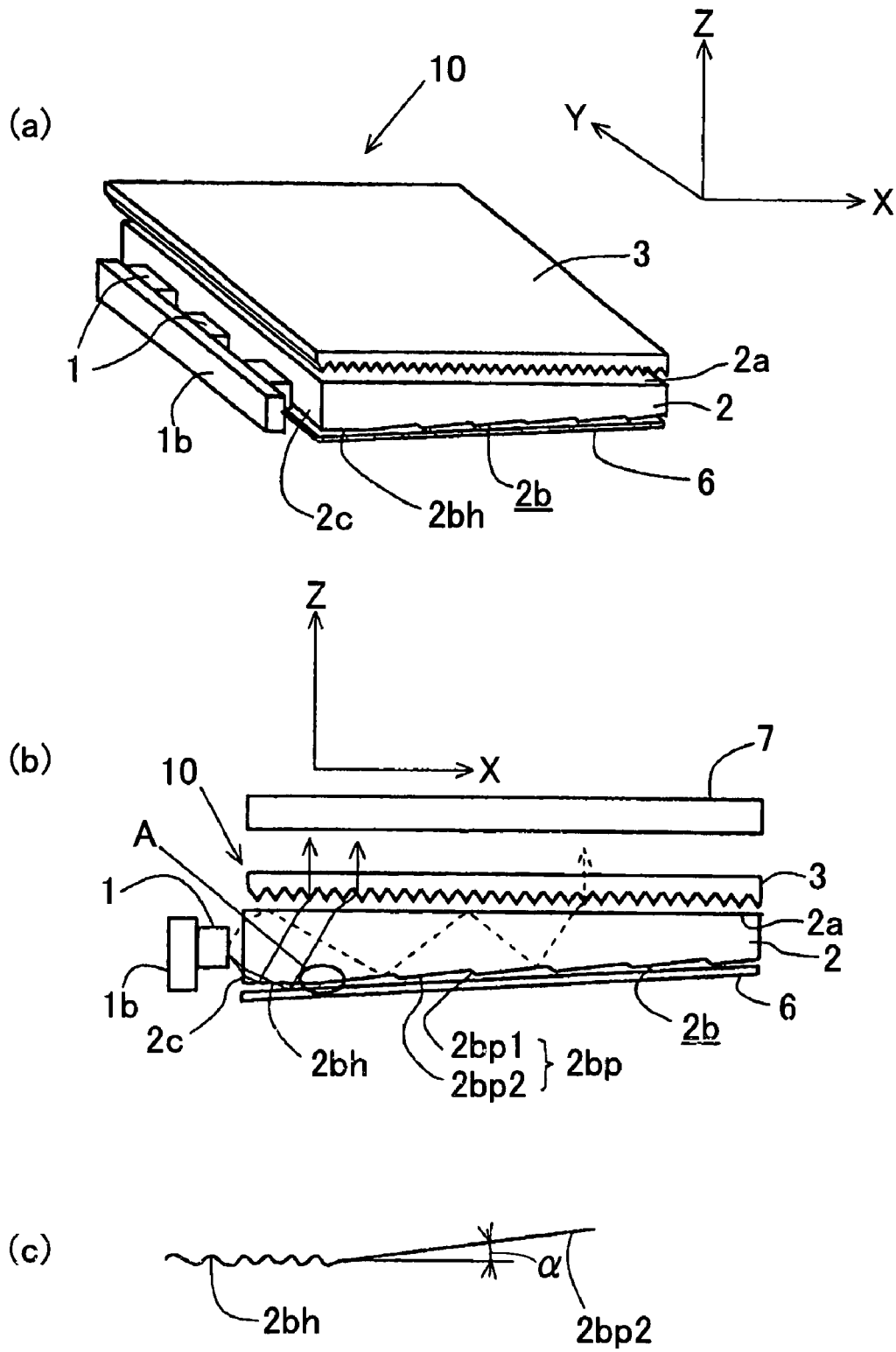
FIG. 1 is an explanatory view showing a planar light source according to a first embodiment of the present invention.

FIG. 1 illustrates a first embodiment of the planar light source according to the present invention, FIG. 1A representing a perspective view of the planar light source 10, FIG. 1B representing a side view of the same, FIG. 1C representing an enlarged view of portion A in FIG. 1B.

In FIG. 1, reference number 1 represents LEDs as a light source, 2 a light guide plate, 3 a prism sheet and 7 a liquid crystal panel. The light guide plate 2 is rectangular in plan view and formed of a light-transmitting resin, such as polycarbonate. 2a denotes a top surface of the light guide plate 2, and 2b a bottom surface. Designated 2c is a light receiving side surface 2c facing the LEDs 1. The light guide plate 2 has an auxiliary reflection surface 2bh in its bottom surface 2b near the light receiving side surface 2c. The auxiliary reflection surface 2bh has relatively small prism undulations or textured undulations. The prism or textured undulations are provided in a regular or irregular pattern. In the bottom surface 2b, a portion adjoining the auxiliary reflection surface 2bh is formed with a prism reflection surface having a plurality of asymmetric prisms 2bp. The asymmetric prisms 2bp each have a down slope 2bp1 and an up slope 2bp2. The down slope 2bp1 is so configured that its distance to the top surface 2a sharply increases as a point of interest on the slope moves away from the light receiving side surface 2c. The up slope 2bp2 is so configured that its distance to the top surface 2a moderately decreases. As shown in FIG. 1C, an inclination angle a of the up slope 2bp2 of the asymmetric prisms 2bp is about 1 degree to several degrees. Three LEDs 1 are held on a retainer member 1b at positions facing the light receiving side surface 2c.

Figure 5:
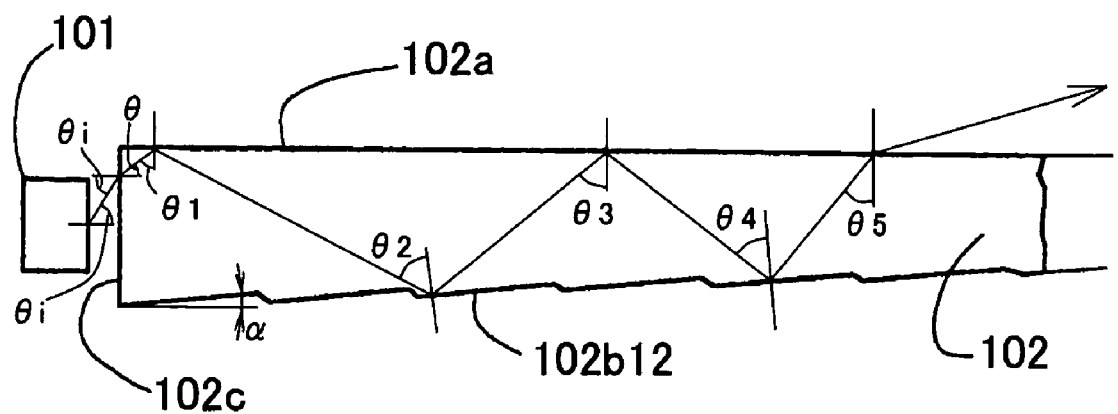
FIG. 5 is an explanatory diagram showing a normal reflection path in the planar light source of FIG. 4.

In this construction, when a predetermined amount of electricity is supplied from a power supply not shown to the LEDs 1, the LEDs 1 illuminate in white or a predetermined color. Of the rays of light emitted from the LEDs 1, one that has entered the light guide plate 2 through the light receiving side surface 2c, as shown by a dotted line in FIG. 1B, has a smaller refracted angle than the critical angle of the light guide plate 2, so that, on the same principle as explained in the conventional case of FIG. 5, when the ray first reaches the top surface 2a, its incident angle on the surface ($\theta_1$ in FIG. 5) is greater than the critical angle and thus totally reflected. Then, the ray is repetitively reflected between the top surface 2a and the bottom surface 2b, as shown by the dotted line in FIG. 1B, with its incident angle decreasing by an inclination angle of the slope α upon each reflection.

When the incident angle is less than the critical angle, the ray is refracted and emitted outside. The light ray that has followed a normal path and exited from the top surface 2a of the light guide plate 2 enters the prism sheet 3.

Rays of light that were refracted downward by the light receiving side surface 2c and reached the auxiliary reflection surface 2bh are scattered there. Some of the scattered rays directly travel toward the top surface 2a and some exit downward and are reflected by a reflector plate 6 to reenter the light guide plate 2 and travel toward the top surface 2a, as indicated by solid lines in FIG. 1. The light that has reached the top surface 2a, if its incidence angle on the top surface 2a is less than the critical angle, exits the light guide plate 102 and enters the prism sheet 3. So, there are light paths using the auxiliary reflection surface 2bh in addition to the light paths using the asymmetric prisms 2bp indicated by a dashed line in FIG. 1. As a result, light can be emitted upward from even an area of the top surface 2a of the light guide plate 2 which is close to the light receiving side surface 2c, thus expanding the illumination area to near the light receiving side surface 2c. The light that has entered the prism sheet 3 is specular-reflected in the prism sheet 3 until it changes it propagation direction to a Z direction. The light traveling in the Z direction is now incident on the liquid crystal panel 7. Therefore, the light passes through the liquid crystal in an ideal direction, making a clear and vivid image display possible.

Figure 6:
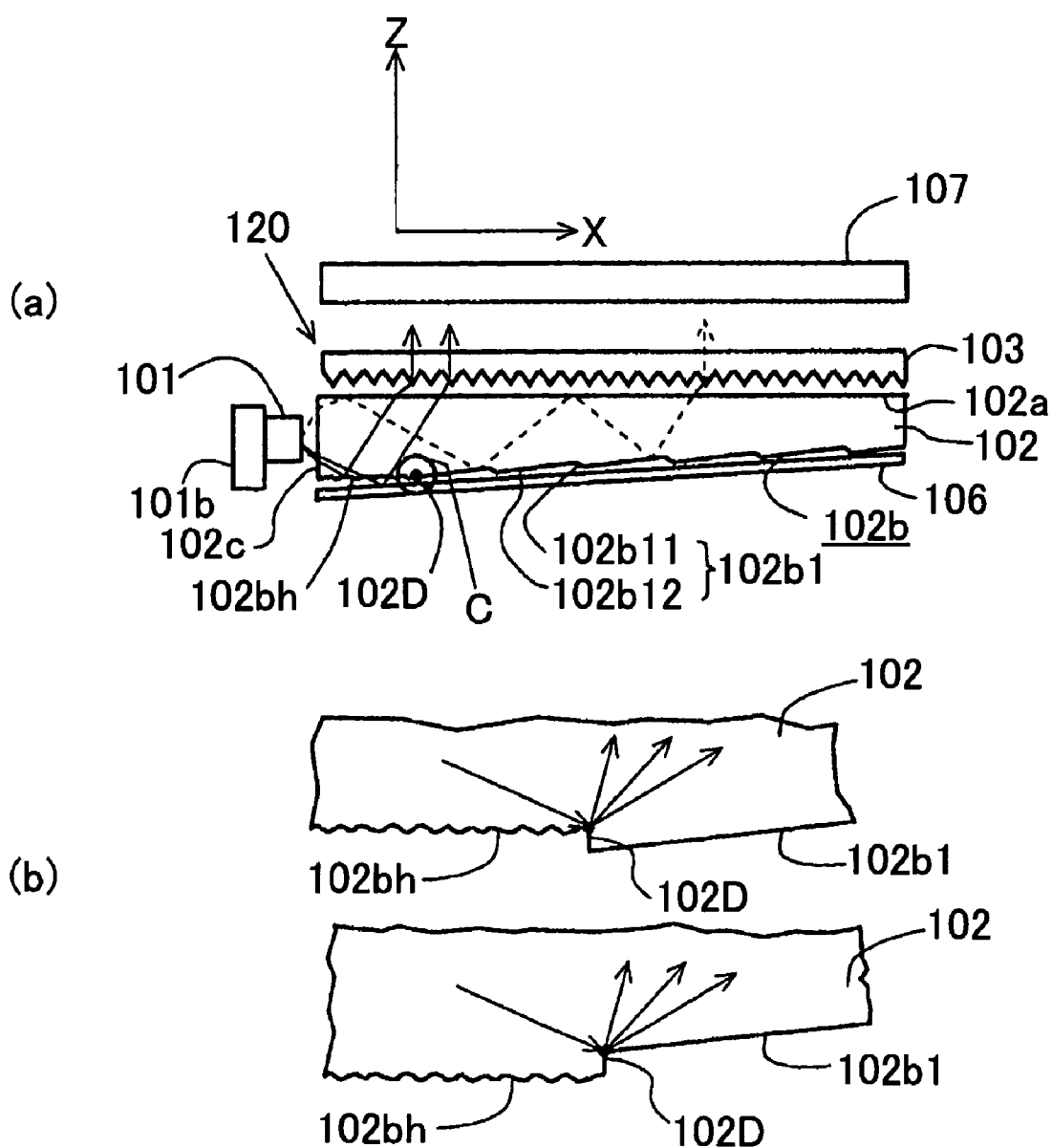
FIG. 6 is an explanatory view showing an improved planar light source over FIG. 4.
Figure 7:
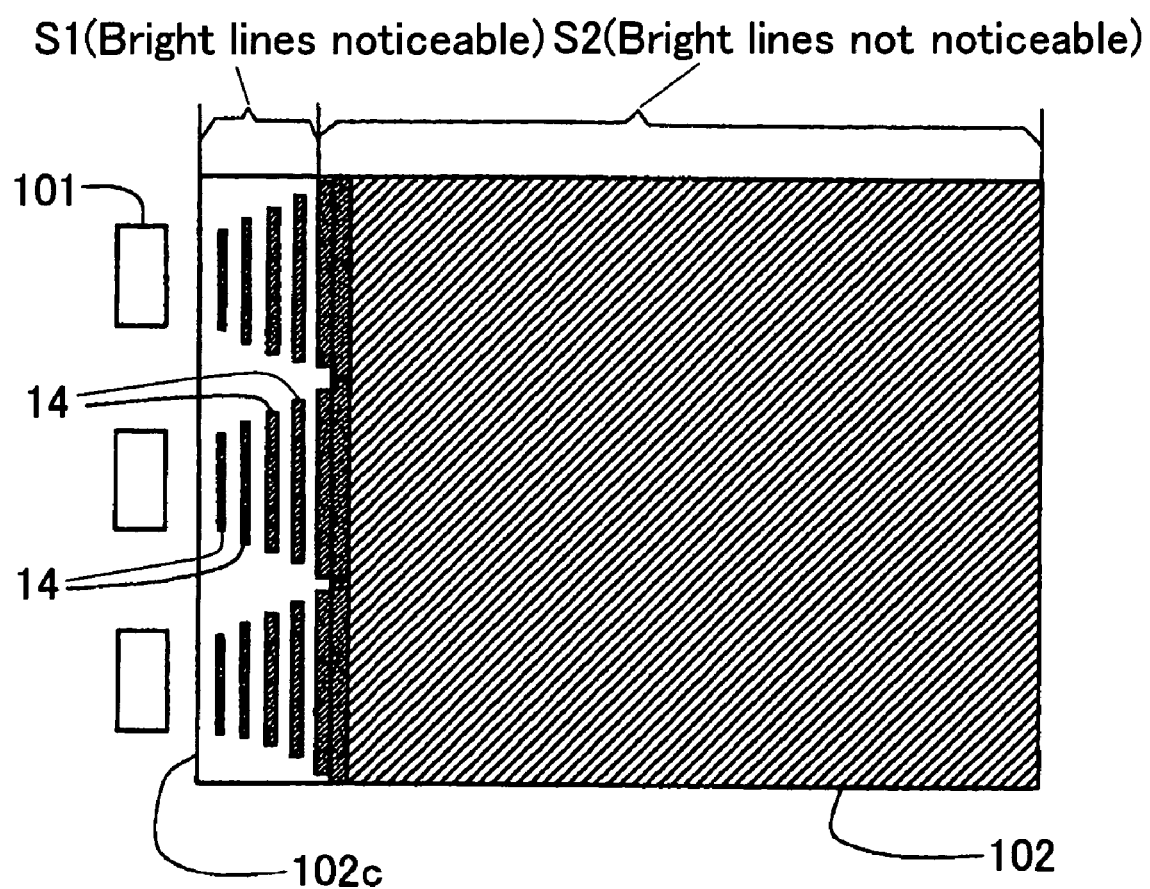
FIG. 7 is a plan view showing how the improved planar light source of FIG. 6 appears when illuminated.
Figure 8:
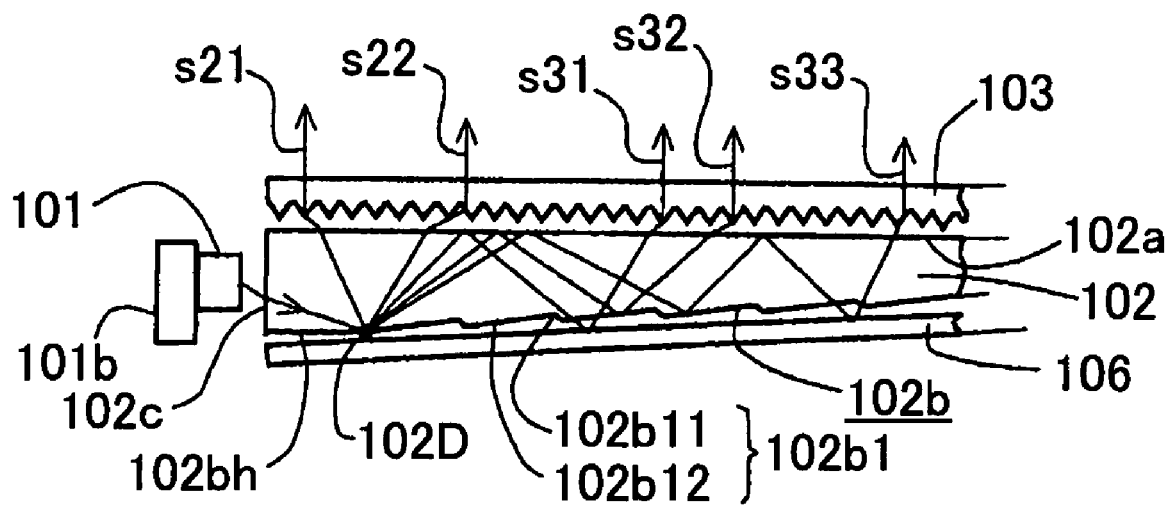
FIG. 8 is an explanatory diagram showing normal reflection paths in the improved planar light source of FIG. 6.
Figure 9:
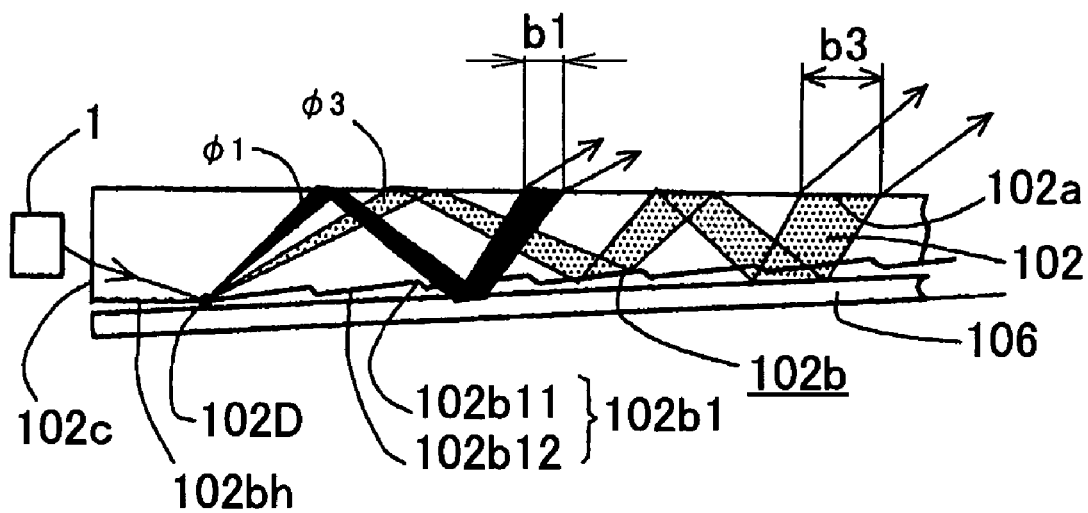
FIG. 9 is an explanatory diagram showing abnormal reflection paths in the improved planar light source of FIG. 6.

In the light guide plate 2 of the planar light source 10 according to the first embodiment, as shown in the enlarged view of FIG. 1C, no step, such as observed in the conventional planar light source, is formed at a boundary between the auxiliary reflection surface 2bh and the prism reflection surface of the asymmetric prisms 2bp. The step discussed here refers to the one formed in the conventional planar light source 120 of FIG. 6 (a clearly distinguishable step with a right-angled edge, equivalent to 102D in FIG. 8). Therefore, no secondary light source caused by the step is formed. This means that a dark-bright fringe pattern produced during illumination by the secondary light source-induced bright lines is not formed, thus preventing a possible degradation of liquid crystal display quality.

Figure 2:
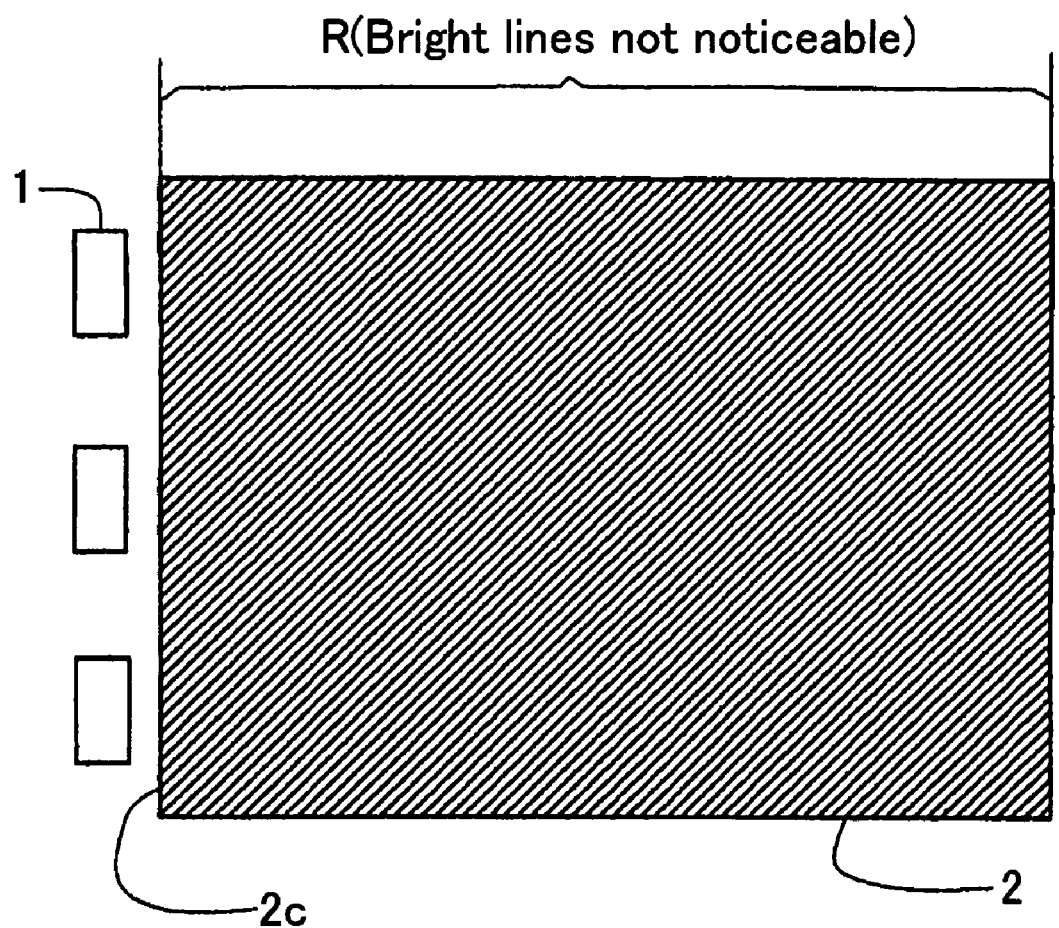
FIG. 2 is a plan view showing how the planar light source of FIG. 1 appears when illuminated.

FIG. 2 is a plan view showing how the planar light source 10 of FIG. 1 appears when illuminated. As shown in the figure, a whole surface area R of the light guide plate 2 is uniformly illuminated, with no such conspicuous bright lines as observed in the conventional planar light source. The reason that no step is formed is that, when the light guide plate 2 is molded from resin, inserts (in-cavity molding pieces having recessed and raised transfer surfaces) installed inside a mold frame are formed as a single-piece insert. That is, the two pieces that have conventionally been used in the prior art are formed into a single integral insert. Since the undulation pattern is transferred from this one-piece insert, the step formed by combining a plurality of inserts is eliminated and is thus no longer transferred to the light guide plate.

Figure 10:
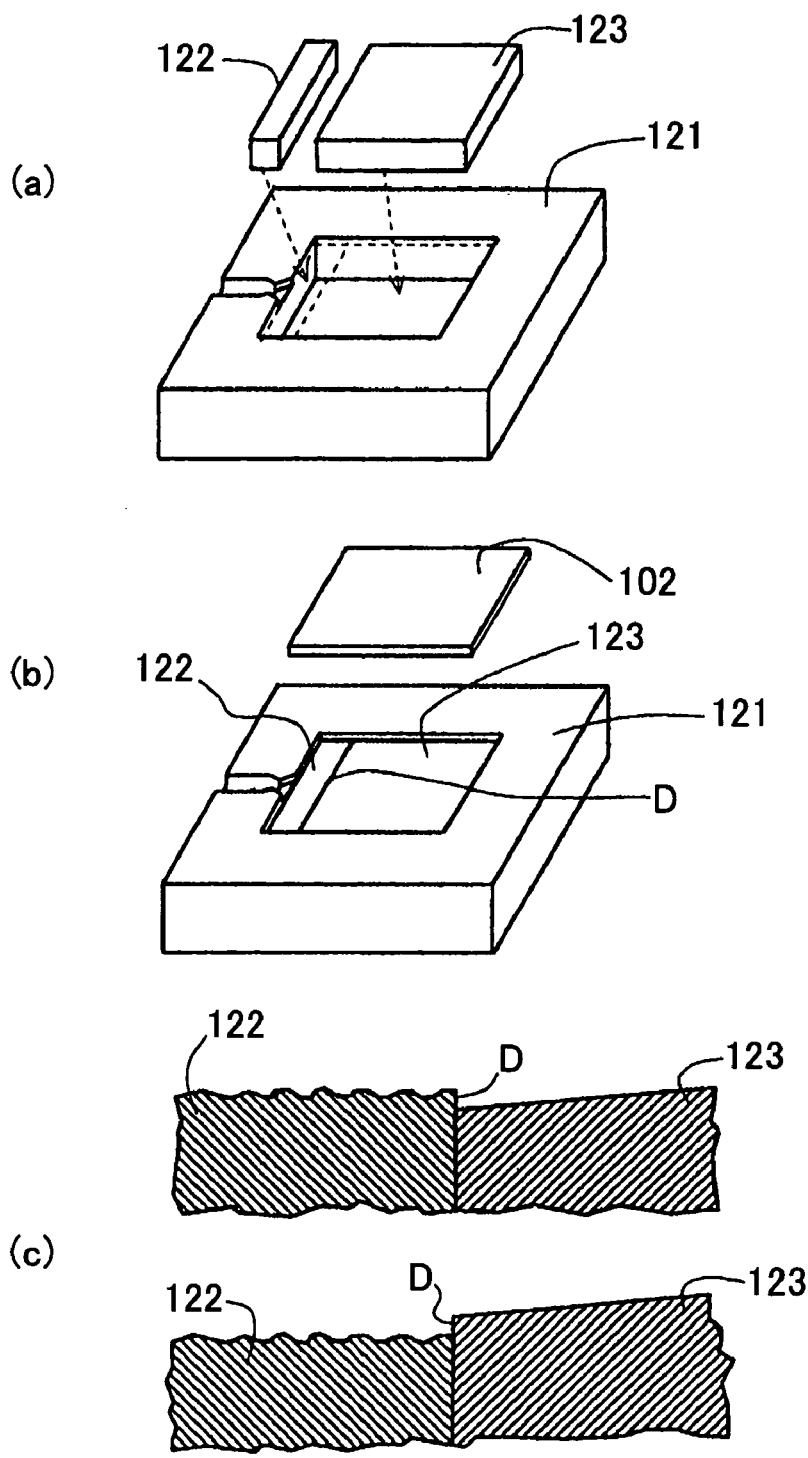
FIG. 10 is an explanatory diagram showing a process of manufacturing the planar light source of FIG. 6.

Next, a method of manufacturing the planar light source 10 shown in FIG. 1 will be explained, centering particularly on the manufacture of the light guide plate 2. FIG. 3 shows a method of forming the light guide plate 2. In FIG. 3A reference number 21 denotes a mold for molding the light guide plate 2 which has a single insert 23 installed inside a mold frame 22. The insert 23 is made by forming two components, which have conventionally been formed separate, into a single integral piece. The surface of the insert 23 is formed with an undulated auxiliary pattern portion 23s corresponding to the auxiliary reflection surface 2bh of the light guide plate 2 and with an undulated prism pattern portion 23p corresponding to the reflection surface of the asymmetric prisms 2bp. FIG. 3B is a cross section showing the undulations near a boundary on the surface of the insert 23 between the auxiliary pattern portion 23s and the prism pattern portion 23p. It is seen that the boundary between the two patterns is smooth, with no such a step as observed in the prior art (see FIG. 10).

Next, a process of forming the light guide plate 2 using the mold 21 will be explained. First, the insert 23 is set inside the mold frame 22 and then a melted resin is injected into a cavity. This causes the undulations of the auxiliary pattern portion 23s and the prism pattern portion 23p formed on the surface of the insert 23 to be transferred onto the bottom surface 2b of the light guide plate 2. Since the insert 23 has no step on its surface between the two undulated patterns, as described above, the bottom surface 2b of the light guide plate 2 is not formed with the above-described step found in the conventional light guide plate 2.

Now, one example method of forming the prism pattern portion 23p and the auxiliary pattern portion 23s on the surface of the insert 23 will be explained by referring to FIG. 3C.

(1) First, prism grooves are cut, as by mechanical machining, in the entire surface of the insert 23 to form the prism pattern portion 23p.

(2) Then, with a part of the prism pattern portion 23p left exposed, the remaining part of the prism pattern portion 23p is covered with a mask M of resin or rubber.

(3) In this state, the exposed part of the prism pattern portion 23p is ground as by honing to form the auxiliary pattern portion 23s consisting of an irregular pattern of fine, textured undulations.

(4) As a last step, the mask M is removed. The insert 23 thus fabricated has the prism pattern portion 23p and the auxiliary pattern portion 23s formed on desired, allocated areas of its surface. Furthermore, the insert 23 has no step on its surface at a boundary between the two pattern portions 23p and 23s.

As described above, in the planar light source of this invention, since no step is formed on the reflection surface of the light guide plate when the insert pattern is transferred during molding, bright lines which in prior art are induced by the step become indistinguishable. As a result, the formation of a dark-bright fringe pattern caused by the bright lines is prevented, improving a liquid crystal display quality.

What is claimed is:

1. A planar light source comprising:
a light guide plate made of a platelike, light-transmitting material and having a bottom side that comprises a plurality of different kinds of reflection means that form a reflection surface; and
an illuminating light source arranged opposite a light receiving side surface of the light guide plate,
wherein two of said reflection means meet at a smooth boundary that is free of any step,
wherein a first one of said reflection means is formed of textured undulations of a predetermined shape and a second one of said reflection means is formed of prisms,
wherein each of said prisms has an upslope that forms an angle β relative to said first one of said reflection means.

2. The planar light source according to claim 1, wherein said plurality of different kinds of reflection means are disposed side by side on said bottom side of said plate.

* * * * *

UNITED STATES PATENT AND TRADEMARK OFFICE
CERTIFICATE OF CORRECTION

| | | |
|---|---|---|
| PATENT NO. | : 7,097,340 B2 | Page 1 of 1 |
| APPLICATION NO. | : 10/694994 | |
| DATED | : August 29, 2006 | |
| INVENTOR(S) | : Okuwaki et al. | |

It is certified that error appears in the above-identified patent and that said Letters Patent is hereby corrected as shown below:

Column 8, line 59, delete "β" and insert --α--.

Signed and Sealed this

Twenty-seventh Day of March, 2007

JON W. DUDAS
*Director of the United States Patent and Trademark Office*